Figure 1:
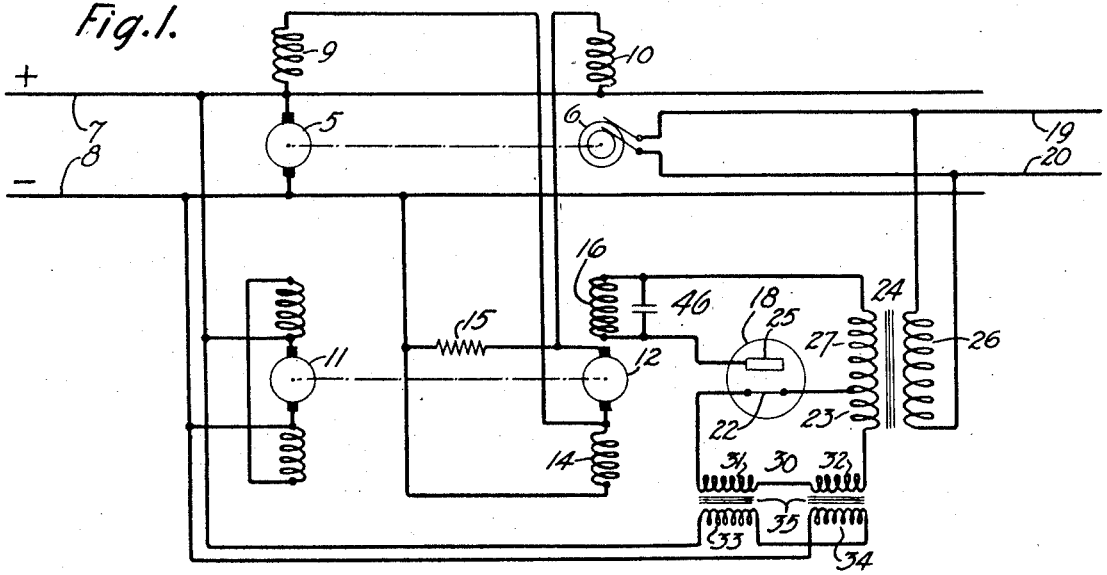

Aug. 11, 1925.

H. M. STOLLER ET AL 1,548,959

CONTROL REGULATOR

Filed July 3, 1924

Inventors:
Hugh M. Stoller
Edmund R. Morton
by E. W. Adams Att'y.

Patented Aug. 11, 1925.

1,548,959

UNITED STATES PATENT OFFICE.

HUGH M. STOLLER, OF MOUNTAIN LAKES, NEW JERSEY, AND EDMUND R. MORTON, OF NEW YORK, N. Y., ASSIGNORS TO WESTERN ELECTRIC COMPANY, INCORPORATED, OF NEW YORK, N. Y., A CORPORATION OF NEW YORK.

CONTROL REGULATOR.

Application filed July 3, 1924. Serial No. 723,873.

*To all whom it may concern:*

Be it known that we, HUGH M. STOLLER and EDMUND R. MORTON, citizens of the United States of America, residing at Mountain Lakes, in the county of Morris, State of New Jersey, and New York, in the county of New York, State of New York, respectively, have invented certain new and useful Improvements in Control Regulators, of which the following is a full, clear, concise, and exact description.

This invention relates to a regulator for electric circuits particularly to a regulator for a motor generator set.

One object of the invention is to provide substantially uniform regulation in circuits of the above mentioned character throughout a wide range of variations in load and power supply.

Another object of this invention is to provide a simple regulator for automatically and simultaneously controlling both the speed and generator excitation of a motor generator set which is subject to wide variations both in power supply and load conditions so as to prevent fluctuations in the characteristics of the output.

One feature of this invention consists in connecting the field windings of a motor generator set in a bridge arrangement across one set of terminals to which is connected an auxiliary generator which functions to control the field excitation of both the motor and generator. In order to control the action of this auxiliary generator synchronously with variations in the conditions under which the set is operated, a regulator of the electron discharge or vacuum tube type is provided. Such a regulator also has the advantage of having no vibrating parts which require adjustment or which might produce undesirable fluctuations in the output.

As is well known in the art, the cathode of a vacuum tube serves as a source of electrons which travel to the anode. The amount of this electron stream or space current depends upon several factors, upon the electric field within the tube and also particularly upon the temperature of the cathode, an increase in temperature producing a greater space current. It is also well known that changes in the temperature of the cathode create a more than proportional change in the space current of the tube so that a vacuum tube may be made to respond very rapidly to changes in the temperature of the cathode.

Another feature of this invention consists in directly controlling the impedance of the vacuum tube in response to variations in both power supply and load conditions so as to aid in maintaining a constant output.

Figure 2:
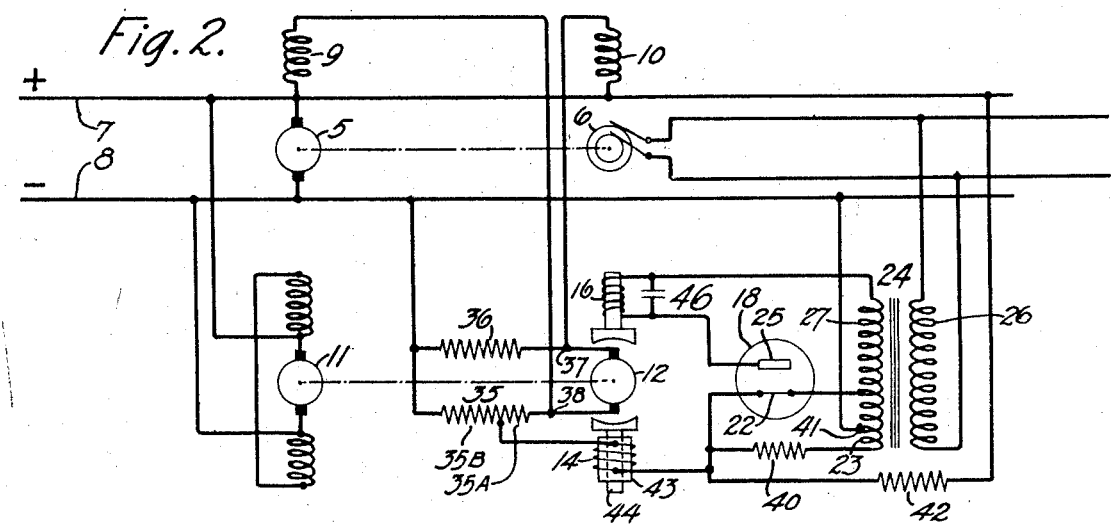
Figure 3:
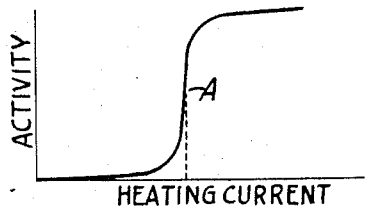

These and other features of the invention will be more clearly understood by reference to the following description in connection with the drawing, in which:

Fig. 1 shows diagrammatically an embodiment of this invention in which the cathode is heated by current from the generator, the amount of which is controlled by fluctuations in the power supply;

Fig. 2, an embodiment of the invention in which the cathode is heated by current from both the power supply and output terminals, and Fig. 3 shows a curve which illustrates the variation of the thermionic emission of the cathode with respect to heating current.

Fig. 1 shows a motor generator set comprising a motor 5 and a generator 6 directly coupled together. The motor receives power from the direct current mains 7—8. The generated output is regulated by means of an auxiliary generator 12 which is here shown driven by a shunt motor 11, but which may be directly connected to the main motor 5. The motor field winding 9 and the generator field winding 10 together with the auxiliary generator main field winding 14 and resistance 15, are arranged in a bridge, one set of terminals of which is connected to the direct current mains 7—8 and the other set to the armature of the regulator generator. By regulating the voltage of the auxiliary generator it is possible to control the current to both the motor and generator fields, and thus to simultaneously and oppositely vary the excitation of both the motor and generator. The action of the regulator is controlled by a two electrode vacuum tube 18 which directly controls the current to the auxiliary generator differential field winding 16. The filament 22 of this vacuum tube is heated by alternating current from the secondary winding 23 of the transformer 24, the primary 26 of which is connected to the generator output terminals 19—20. Current is supplied to the differential winding 16 through the rectifying action of the vacuum tube 18 the condenser 46 averaging the pulsating current from the vacuum tube. The circuit can be traced from the cathode 22 through the secondary winding 27, differential field winding 16 to the anode 25 and back through the vacuum tube to the cathode 22.

As is well known the thermionic activity of a cathode varies with the heating current supplied thereto in a manner similar to that shown in the curve of Fig. 3 where the abscissae represent the heating current and the ordinates represent the corresponding thermionic activity of the cathode. The filament 22 and the transformer 24 should be so chosen that at normal generated voltage, the heating current will be such as to give the thermionic activity of the filament a value corresponding to A, the mid-point of the steep portion of the characteristic curve. The resistance of the main field winding 14 and the resistance element 15 are so adjusted with respect to the resistances of the motor winding 9 and generator field winding 10 that practically no current flows through the generator armature 12 due to the voltage of the direct current mains 7—8. At normal generated voltage the flux due to the differential winding 16 practically balances the flux of the main winding 14 and no voltage is generated in the armature 12. If the generated voltage tends to rise, due to some cause such as a decrease in load, the current through the cathode 22 will be increased, which in turn causes an increase in the space current of the tube and a resulting increase in the current through the differential winding 16. Since a small increase in the current to the filament 22 produces a much more than proportional increase in the space current of the tube, the increase in current to the differential winding 16, will cause the differential field to overpower the main field. This sends current through the regulator in such a direction as to strengthen the motor field 9 and weaken the generator field 10 thereby reducing the output voltage. It will also be noted that this action of the regulator also decreases the current through its own main field winding 14 thus producing a compounding action which aids in rapidly reducing the fluctuations of the generator voltage. Similarly, if the voltage output of the generator tends to fall off, the activity of the filament decreases and the differential field of the regulator changes in the opposite direction, thereby strengthening the generator field and weakening the motor field thus raising the output current.

With the arrangement described above, fluctuations in the power supply only produce a correcting action through the regulator after they have produced fluctuations in the generator output so that it may be preferred in some cases to provide means for controlling the action of the regulator directly with fluctuations in the power supply condition. An inductance device 30 comprising windings 31 and 32, which are connected in the filament heating circuit, windings 33 and 34, which are opposingly connected in series to the direct current mains 7 and 8, and a magnetic core 35 are therefore provided. By properly regulating the amount of direct current which flows through the windings 33 and 34 at normal direct current voltage it is possible to adjust this device so that an increase in direct current through the windings, produced by a rise in voltage will reduce the impedance of the windings 31 and 32 and cause a rise in the temperature of the cathode 22 thus decreasing the generator excitation and increasing the motor excitation so as to prevent a rise in the generator voltage. In this way the output of the generator is regulated directly in response to variations in the power supply so as to aid in maintaining a constant output.

Fig. 2 shows a direct current motor 5 comprising an alternating current generator 6. Power is supplied from the direct current mains 7 and 8 to the motor 5 and the motor and generator fields 9 and 10. The motor field 9 is connected in series with resistance 35 and the generator field 10 in series with resistance 36. Bridged between points 37 and 38 at which the motor field 9 and generator field 10 are connected to the resistances 35 and 36 respectively, is the armature of the regulator generator 12. This generator is here shown driven by a shunt motor 11. By controlling the current through the armature of the regulator, it is possible to control the fields of both the motor and the generator in a similar manner as in the circuit shown in Fig. 1. The regulator generator is provided with a main field winding 14 which receives current from the direct current mains and a differential field winding 16. The differential field winding receives rectified current from the vacuum tube rectifier 18 in a similar manner as described above in connection with the regulator of Fig. 1. Connected in series with the cathode 22 and the secondary winding 23 is a resistance element 40 having a resistance which is preferably greater than that of the filament. A tap 41 from the secondary winding 23 to the negative main 8 and a connection from the positive main through resistance 42 to the filament 22 serve to admit a certain amount of direct current to the cathode. This controls the action of the regulator directly with fluctuations in the power supply.

Under normal conditions direct current through the resistance 42 flows through the low resistance path offered by the filament 22 directly to the negative main 8. Under these conditions, current also flows from the positive main 7 through the motor field winding 9, resistance 35^A, regulator main field winding 14, low resistance cathode 22 to the negative main 8. However, if the filament circuit is broken, current through the resistance 42 no longer has a low resistance path to the negative mains, but instead two parallel paths, one through the comparatively high resistance 40 and the other through the regulator main field winding 14 and resistance 35^B, thereby reversing the current through the regulator main field winding 14 and reducing the generator voltage thus calling the attention of the operator to the fact that the regulator does not function.

Since the regulator main winding 14 is connected in parallel with the resistance 35^B between the motor field winding 9 and the negative main 8, a change in voltage of the regulator 12 tends to change the current through the main winding 14 in a similar manner as in the circuit shown in Fig. 1 thus producing a similar compounding action.

In order to prevent hunting, a copper sleeve 43 is provided around the main field pole piece 44 of the regulator 12. This prevents the main field from changing too rapidly in response to sudden fluctuation in the voltage and thus helps to eliminate fluctuations in the generator output.

It is understood that the embodiments of the invention shown above may be variously modified without departing from the scope of this invention as defined in the appended claims.

What is claimed is:

1. A regulator for a motor generator set having a motor field winding and generator field winding, comprising an impedance element connected in series with the motor field winding, an impedance element connected in series with the generator field winding, a regulator generator bridged between said field windings so as to simultaneously regulate the excitation of both the motor and generator, and means for controlling the action of said regulator generator in response to fluctuations in a characteristic of the output of the main generator.

2. A regulator in accordance with claim 1 comprising separate and simultaneously acting means for controlling the action of the regulator generator in response to fluctuations in the power supply.

3. A regulator according to claim 1 in which said means comprises an electron discharge device and means responsive to fluctuations in a charactertistic of the output of the generator for controlling the impedance of said device.

4. A regulator according to claim 1 in which said means comprises an electron discharge device having a thermionic cathode, and connections for supplying said cathode with heating current from said generator.

5. A regulator for a motor generator set having a motor field winding and a generator field winding, comprising an impedance element connected in series with the motor field winding, an impedance element connected in series with the generator field winding, a regulator generator bridged between said field windings so as to simultaneously and oppositely regulate the excitation of both the motor and the generator, an electron discharge device for controlling the action of said auxiliary generator, means responsive to fluctuations in a characteristic of the output of the generator for controlling the space current of said electron discharge device, and separate and simultaneously acting means for controlling the space current of said electron discharge device in response to fluctuations in the power supply.

6. A regulator for a motor generator set having a motor field winding and a generator field winding, comprising a resistance element connected in series with the motor field winding, a resistance element connected in series with the generator field winding, an auxiliary generator bridged between said field windings so as to simultaneously and oppositely vary the excitation of both the motor and the generator, a field winding for said auxiliary generator, an electron discharge device having an anode and a thermionic cathode connected in circuit with said field winding, and means for supplying current from the main generator for heating said cathode.

7. A regulator according to claim 6, characterized by means directly responsive to fluctuations in the power supply for controlling the heating current supplied to said cathode.

8. In combination, a machine for converting electrical energy of one form into electrical energy of another form, means for controlling a characteristic of the output of said machine said means comprising an electron discharge device, means for controlling the space current of said device in response to fluctuations in a characteristic of the electrical energy supplied to said machine, and means for controlling the space current of said device in response to fluctuations in a characteristic of the output of said machine, said means acting simultaneously.

9. A regulator for a motor generator set having a motor field winding and a generator field winding comprising an auxiliary generator having a main field winding, a resistance element, circuit arrangements for connecting said motor field winding and said auxiliary generator main winding in series to a source of current, circuit arrangements for connecting said generator field winding and said resistance element in series to said source of current, circuit arrangements for bridging the auxiliary generator armature between the junction of said motor field winding and said auxiliary generator main field winding and the junction of the said generator field winding and said resistance element, a differential field winding for said auxiliary generator, and means for varying the current supplied to said differential field winding in response to variations in a characteristic of the output of the main generator.

10. A regulator according to claim 9 in which said means comprises an electron discharge device.

11. A regulator according to claim 9 in which said means comprises an electron discharge device having an anode and a thermionic cathode connected in circuit with said differential field winding, and connections from said main generator for supplying to said cathode heating current varying in response to fluctuations in a characteristic of said main generator.

12. A regulator according to claim 9 in which means comprises an electron discharge rectifier having an anode and a thermionic cathode, and a transformer having a primary winding connected to the output terminals of the main generator, a secondary winding connected to said cathode for supplying heating current thereto, and another secondary winding connected through said rectifier to said differential field winding.

In witness whereof, we hereunto subscribe our names this 27th day of June A. D., 1924.

HUGH M. STOLLER.
EDMUND R. MORTON.